United States Patent [19]

Seifert

[11] Patent Number: 4,554,118
[45] Date of Patent: Nov. 19, 1985

[54] PROCESS OF INLAYING A DESIGN IN MOLDED SIMULATED MARBLE

[76] Inventor: Janice P. Seifert, 35 Brentwood Rd., Chelmsford, Mass. 01824

[21] Appl. No.: 550,383

[22] Filed: Nov. 10, 1983

[51] Int. Cl.$^4$ .............................................. B29C 9/00
[52] U.S. Cl. ...................................... 264/73; 264/245; 264/255
[58] Field of Search ................................. 264/245–247, 264/132, 134, 135, 73, 74, 255; 427/260, 268; 428/204

[56] References Cited

U.S. PATENT DOCUMENTS

| | | | |
|---|---|---|---|
| 125,122 | 4/1872 | Davey | 264/74 |
| 2,622,991 | 12/1952 | Sturm | 264/246 |
| 3,773,886 | 11/1973 | Starr et al. | 264/245 |
| 4,209,486 | 6/1980 | Ross | 264/245 |
| 4,248,816 | 2/1981 | Sheridan | 264/73 |

Primary Examiner—Evan K. Lawrence
Attorney, Agent, or Firm—Andrew F. Kehoe

[57] ABSTRACT

A process of decorating molded, cultured-marble products comprising the steps of applying a release coating to the inner bottom surface of a mold, applying a hardenable transparent acrylic gel on the release coating hardening the gel, hand-painting, with an acrylic paint, a colorful design on the surface of the hardened gel coat, casting a hardenable cultured marble mix in the mold over the gel coat and painted design and allowing the marble mix to harden before removing the resultant decorated cultured marble molding from the mold.

2 Claims, 1 Drawing Figure

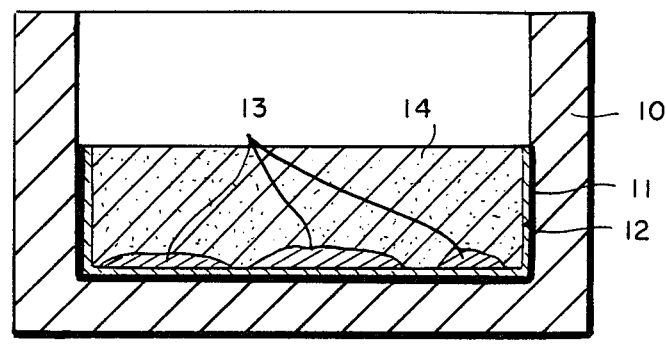

PROCESS OF INLAYING A DESIGN IN MOLDED SIMULATED MARBLE

BACKGROUND OF THE INVENTION

This invention relates to an improved process for inlaying a design in molded simulated marble, hereinafter called, "cultured marble", or marble.

In general, cultured marble, commonly used for sinks, vanity tops, etc., is molded in a mold, which may be in the form of a shallow tray or pan, by applying a transparent release coating (of wax, for example) to the inside of the tray, applying a gel coating on the release coating, allowing the gel coat to gel, and pouring a marble mix in the mold on the gel coat. What is herein called "marble mix" generally comprises a synthetic resin material, catalyst, filler and pigment, the latter being blended into the marble mix to give the finished "marble" the desired color pattern. After the marble mix has hardened into "cultured" marble, the slab with the transparent gel coat thereon is removed from the mold.

Inlaying design in cultured marble does not appear to have been practiced in modern times, although there is some disclosure in U.S. Pat. No. 125,122, issued Apr. 2, 1872, of embedding ornamental objects in artificial marble. The process disclosed in that patent involves laying an object of metal, wood, glass or other rigid material on a mold surface, filling the mold with marble mix, allowing the mix to harden, and then removing the resultant marble slab with the object embedded therein from the mold. However, the marble slab was in an unfinished state and required considerable finishing to give it the desired surface characteristics. Thus, the patentee discloses that "when the marbles or embedded designs are removed from the molds or surfaces on which they are formed, they are rubbed down and stopped with cement. Where any holes may occur they may then be stoned with cement and allowed to dry, after which they are ready for polishing or enameling by the usual processes . . . . " This process clearly was quite time-consuming and required a great deal of handwork.

Similarly, U.S. Pat. No. 4,209,486, issued to Ross, describes a method whereby porous flexible sheet material bearing a design is affixed to the gel coat and then covered with hardenable marble mix.

However, nowhere in the prior art is there taught a process which can withstand substantial thermal and mechanical stress over a prolonged period of time.

SUMMARY OF THE INVENTION

Therefore, it is a primary object of the invention to provide an improved process for inlaying an attractive, hand-painted design in molded cultured marble.

A further object of this invention is to provide cultured marble products bearing designs having excellent visual character, such as floral designs, etc., and appear to be part of the cultured marble.

Yet another object of this invention is to provide an economical method of inlaying acrylic-painted designs on the surface of a transparent acrylic gel coating in a slab of molded cultured marble whereby the acrylic-acrylic bond between the gel coating and the painted design may enhance the physical properties of the end product.

The invention described herein is a novel process having the improvement over prior art which comprises the step of hand-painting attractive and colorful designs onto an interior surface of cultured marble using an acrylic paint directly on the acrylic gel coat. This method yields a cultured marble product having designs which are not susceptible to distortion during the molding process, and which designs appear to be part of the cultured marble itself, rather than merely an added fabric.

Generally, the process of this invention comprises the steps of applying a release coating to the inner bottom surface of a mold and then applying a transparent acrylic gel coat on the release agent. After allowing a sufficient amount of time for the gel coat to harden, any desirable design is hand-painted on the gel coat using an acrylic paint, usually thick enough to form an opaque coating on the gel. Finally, a hardenable marble mix is cast over the gel coat and design and allowed to harden. After allowing sufficient time, as is known in the art, for the cultured marble to harden and upon removal of the molded slab, the painted design is viewable through the transparent gel coat. The cultured marble, processed in this manner, is ideal for decorative sinks, tubs and basins.

It is particularly notable that highly-differentiated, multi-colored designs, such as floral designs, can be readily painted. Moreover even small discontinuities in the design can be readily tolerated rendering a product with easily differentiated, vibrant decorations.

IN THE DRAWINGS

This invention is pointed out with particularly in the appended claims. The foregoing and other features and advantages of the invention will be better understood from the following detailed description taken in conjunction with the accompanying drawings.

FIG. 1 is a cross section of molded cultured marble, as processed by this invention, showing the various layers of materials.

Referring to FIG. 1, which illustrates an improved process for inlaying a design in molded cultured marble, a mold 10 is used for molding such marble. After coating the inside portion of the mold with a release agent 11, a transparent acrylic gel coat layer 12 is sprayed or brushed on top of the release agent to a uniform thickness of, e.g. about 0.010 to 0.020 inches and allowed to harden. Upon the hardening of the gel coat, the desired designs 13 may be hand-painted, using an acrylic paint such as that sold by Grumbacher under the trademark HIPLAR, on the surface of the hardened gel coat. Once the paint has dried, a marble mix 14 is cast in the mold to a level determined by the desired thickness of the finished marble slab.

It is to be understood that the following claims are intended to cover all of the generic and specific features of the invention herein described and all statements of the scope of the invention which might be said to fall therebetween.

What is claimed is:

1. A process of decorating a cultured marble molding produced from a marble mix comprising:
   (a) applying a hardenable transparent acrylic gel coat to the inner bottom surface of a mold treated with a release agent;
   (b) hardening said gel coat;
   (c) applying, with an acrylic paint, a painted design on the top surface of said hardened gel coat;

(d) casting a hardenable marble mix in the mold in such a manner as to cover said gel coat and said painted design; and
(e) allowing the marble mix to harden before removing the resultant decorated cultured marble molding from said mold.

2. A process defined in claim 1 wherein the said cultured marble molding is a sink, tub or basin.

* * * * *